United States Patent
Kim

(10) Patent No.: US 9,862,245 B2
(45) Date of Patent: Jan. 9, 2018

(54) CUSTOMIZED AIR CONDITIONER CONTROLLING SYSTEM AND METHOD THEREOF

(71) Applicant: HYUNDAI MOBIS CO., LTD., Seoul (KR)

(72) Inventor: Jeong Ku Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 665 days.

(21) Appl. No.: 14/093,675

(22) Filed: Dec. 2, 2013

(65) Prior Publication Data

US 2015/0075763 A1    Mar. 19, 2015

(30) Foreign Application Priority Data

Sep. 16, 2013  (KR) .......................... 10-2013-0110969

(51) Int. Cl.
B60H 1/00 (2006.01)

(52) U.S. Cl.
CPC ..... B60H 1/00742 (2013.01); B60H 1/00757 (2013.01); B60H 1/00878 (2013.01)

(58) Field of Classification Search
CPC ............ B60H 1/00742; B60H 1/00757; B60H 1/00878
USPC ................................ 165/11.1, 202, 203, 204
See application file for complete search history.

(56) References Cited

U.S. PATENT DOCUMENTS

| | | | | |
|---|---|---|---|---|
| 5,172,856 A | * | 12/1992 | Tanaka ................ | B60H 1/00742 236/49.3 |
| 5,689,241 A | * | 11/1997 | Clarke, Sr. ............. | G08B 21/06 340/575 |
| 6,078,853 A | | 6/2000 | Ebner et al. | |
| 6,202,934 B1 | * | 3/2001 | Kamiya ............. | B60H 1/00735 165/204 |
| 6,241,686 B1 | * | 6/2001 | Balkin ..................... | A61B 5/16 600/300 |
| 6,419,629 B1 | * | 7/2002 | Balkin ..................... | A61B 5/16 600/300 |

(Continued)

FOREIGN PATENT DOCUMENTS

| | | |
|---|---|---|
| CN | 1936444 A | 3/2007 |
| CN | 201129826 Y | 10/2008 |

(Continued)

OTHER PUBLICATIONS

Chinese Office Action dated Mar. 22, 2016 in counterpart Chinese Patent Application No. 201410040917.4 (8 pages, in Chinese).

(Continued)

Primary Examiner — Ljiljana Ciric
(74) Attorney, Agent, or Firm — NSIP Law

(57) ABSTRACT

A system and method for controlling an air conditioner to provide cooling or heating customized to each occupant of a vehicle by measuring body temperatures of each occupant. The system includes a body temperature measuring unit configured to measure a body temperature of each occupant, a personalized service determining unit configured to determine a personalized service including whether to drive a cooling device or a heating device for each occupant based on the body temperature of each occupant, and an air conditioner controlling unit configured to control the air conditioner discriminatively for each occupant based on a personalized service.

11 Claims, 9 Drawing Sheets

(56) References Cited

U.S. PATENT DOCUMENTS

| | | | |
|---|---|---|---|
| 6,454,178 B1 | 9/2002 | Fusco et al. | |
| 6,527,715 B2* | 3/2003 | Balkin | A61B 5/16 600/300 |
| 7,134,687 B2* | 11/2006 | Breed | B60N 2/4885 280/735 |
| 7,830,270 B1* | 11/2010 | Philbert | B60N 2/002 340/539.15 |
| 8,140,344 B2* | 3/2012 | Kameyama | B60H 1/00742 382/104 |
| 8,176,741 B2* | 5/2012 | Kameyama | B60H 1/00285 62/239 |
| 9,000,907 B1* | 4/2015 | Rembach | B60N 2/002 180/273 |
| 2003/0168838 A1* | 9/2003 | Breed | B60R 21/01526 280/735 |
| 2003/0184065 A1* | 10/2003 | Breed | B60N 2/4885 280/735 |
| 2004/0089005 A1* | 5/2004 | Ichishi | B60H 1/00792 62/214 |
| 2005/0024188 A1* | 2/2005 | Sider | B60H 1/00642 340/425.5 |
| 2005/0275260 A1* | 12/2005 | Patterson | B60N 2/002 297/256.16 |
| 2006/0235753 A1* | 10/2006 | Kameyama | B60H 1/00742 705/15 |
| 2007/0007067 A1* | 1/2007 | Pollehn | B60H 1/00742 180/272 |
| 2007/0057077 A1* | 3/2007 | Huang | F24F 11/001 236/44 C |
| 2007/0193811 A1* | 8/2007 | Breed | B60R 21/01536 180/271 |
| 2008/0114495 A1* | 5/2008 | Suyama | B60H 1/00642 700/276 |
| 2008/0168787 A1* | 7/2008 | Kameyama | B60H 1/00285 62/244 |
| 2008/0297336 A1* | 12/2008 | Lee | B60H 1/00742 340/439 |
| 2010/0106365 A1* | 4/2010 | Visconti | B60H 1/00742 701/36 |
| 2010/0265046 A1* | 10/2010 | Lin | B60H 1/00742 340/425.5 |
| 2012/0142264 A1* | 6/2012 | Sagou | B60H 1/00735 454/75 |
| 2013/0037252 A1* | 2/2013 | Major | B60H 1/00742 165/202 |
| 2013/0219293 A1* | 8/2013 | Goldman-Shenhar | G06F 3/0484 715/751 |
| 2013/0232996 A1 | 9/2013 | Goenka et al. | |
| 2013/0255930 A1* | 10/2013 | Prakah-Asante | B60H 1/00807 165/203 |
| 2013/0314536 A1* | 11/2013 | Frank | H04N 5/33 348/148 |
| 2014/0067204 A1* | 3/2014 | Takahashi | G06F 3/011 701/36 |
| 2015/0025738 A1* | 1/2015 | Tumas | B60H 1/00742 701/36 |
| 2015/0094914 A1* | 4/2015 | Abreu | B60H 1/00742 701/41 |
| 2015/0105976 A1* | 4/2015 | Shikii | G06F 3/0488 701/36 |
| 2016/0318468 A1* | 11/2016 | Ricci | B60R 16/037 |

FOREIGN PATENT DOCUMENTS

| | | |
|---|---|---|
| CN | 102729772 A | 10/2012 |
| JP | 2003-084795 A | 3/2003 |
| JP | 2006-327530 A | 12/2006 |
| KR | 1997-0000652 A | 1/1997 |
| KR | 10-0211376 B1 | 5/1999 |
| KR | 20-0380557 Y1 | 3/2005 |

OTHER PUBLICATIONS

Korean Office Action dated Jul. 24, 2014 in counterpart Korean Patent Application No. 10-2013-0110969 (4 pages, in Korean).

* cited by examiner

[FIG. 1]
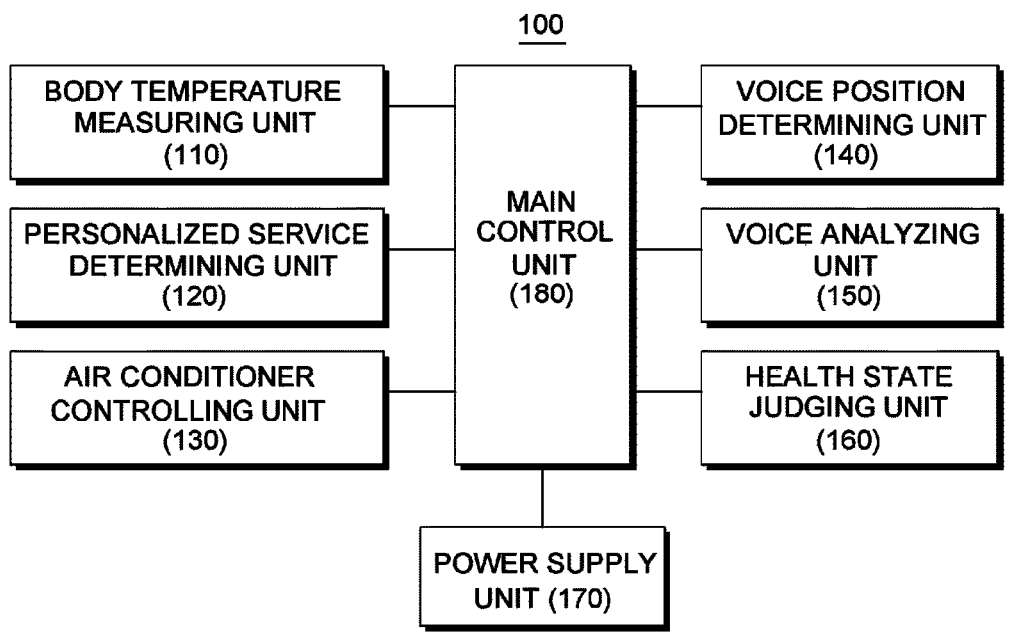

[FIG. 2]
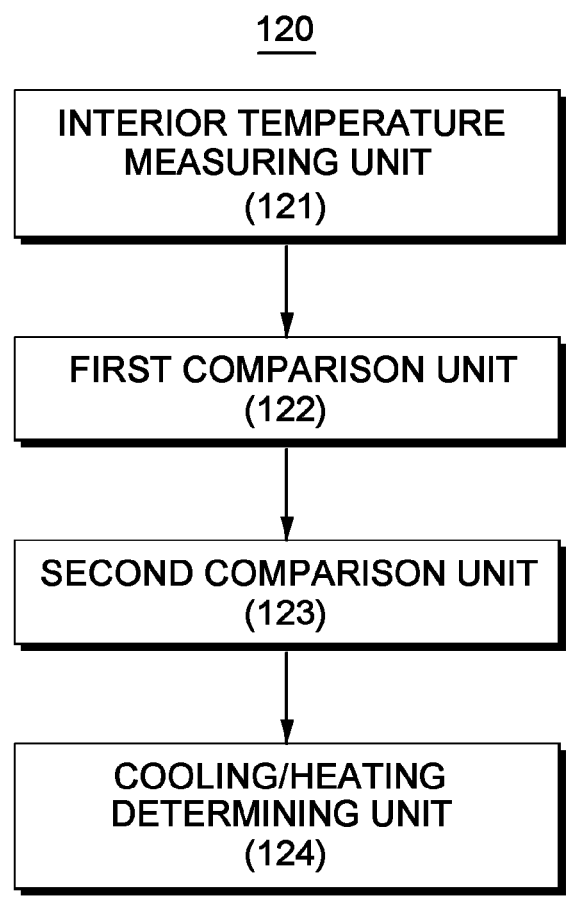

[FIG. 3]
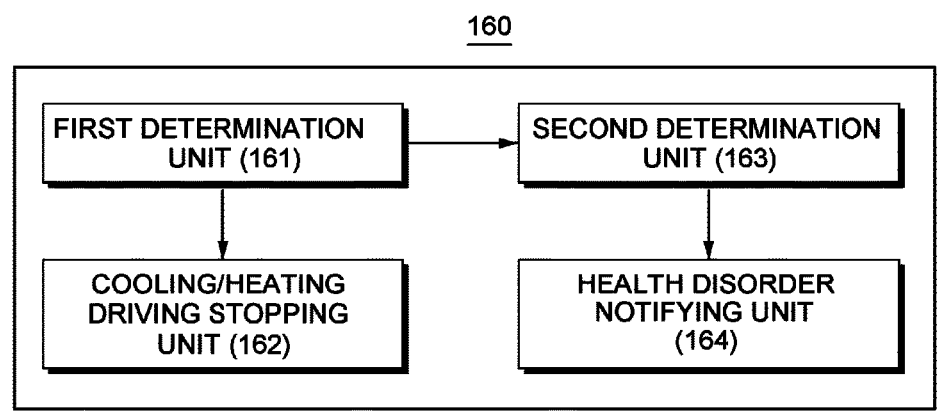

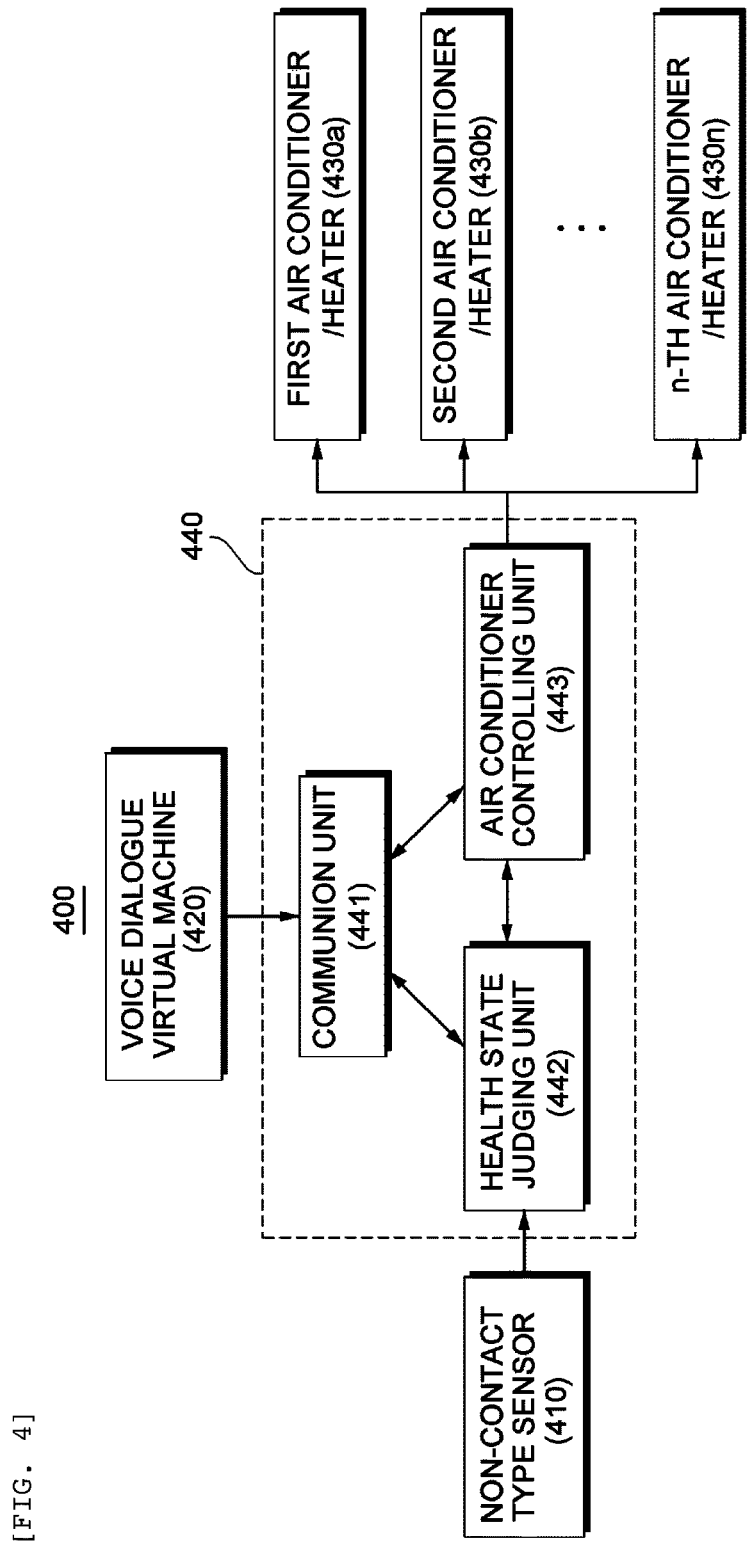
[FIG. 4]

[FIG. 5]
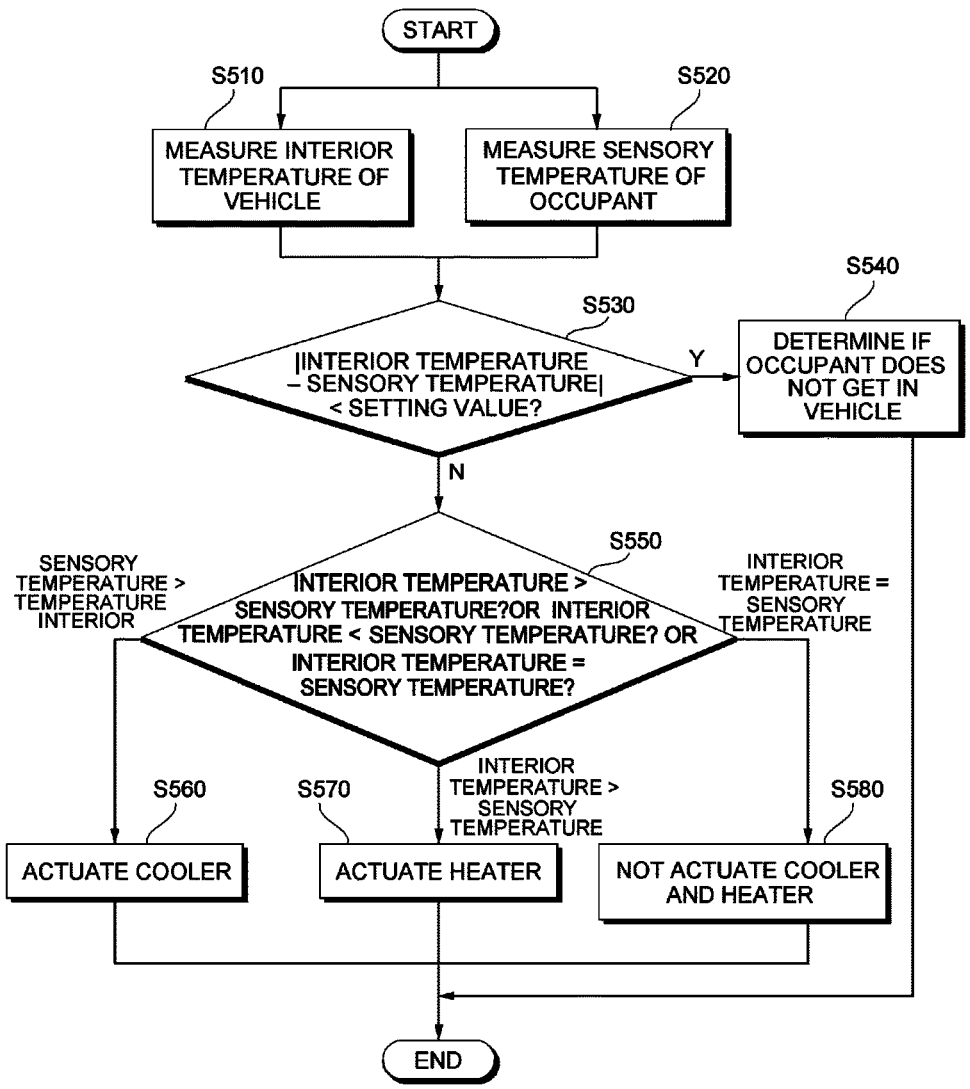

[FIG. 6]
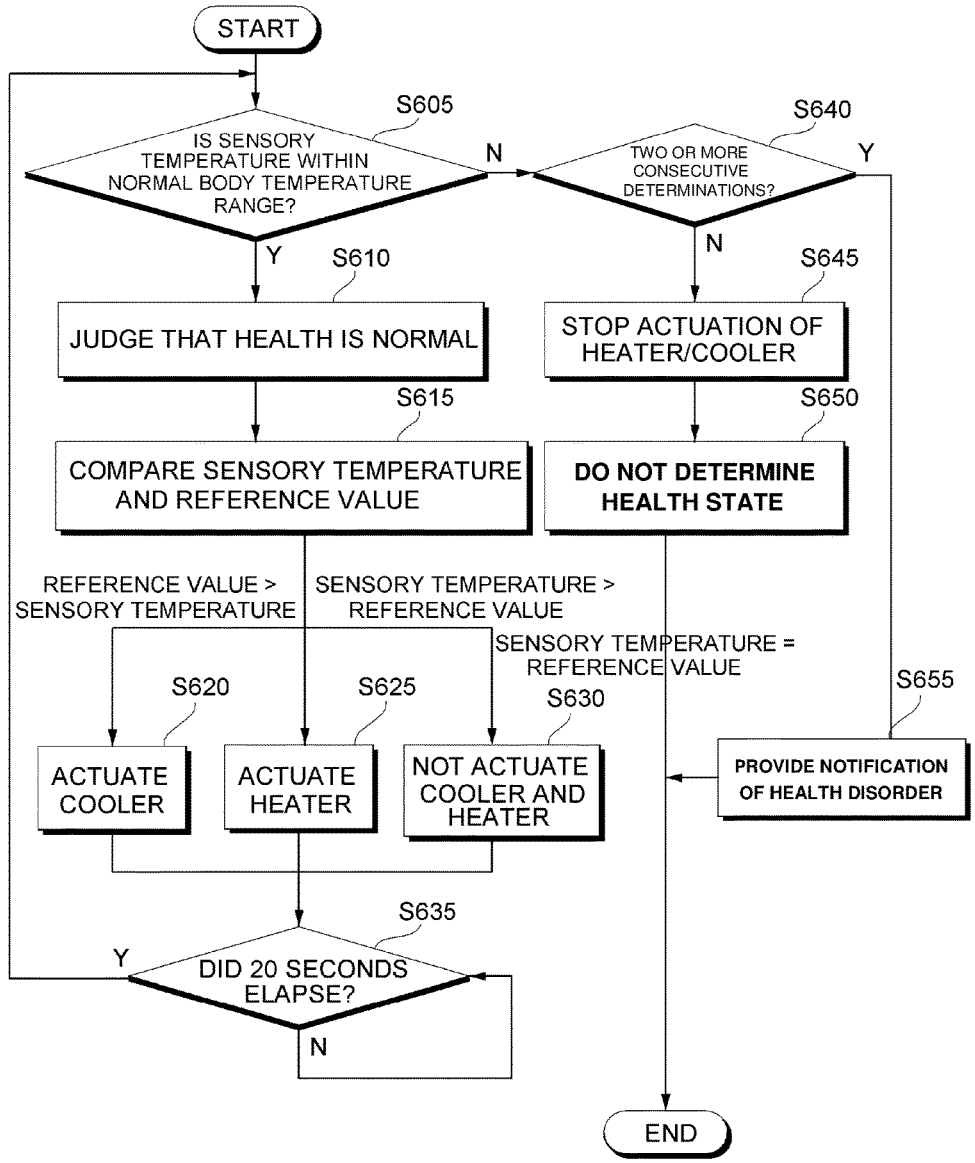

[FIG. 7]
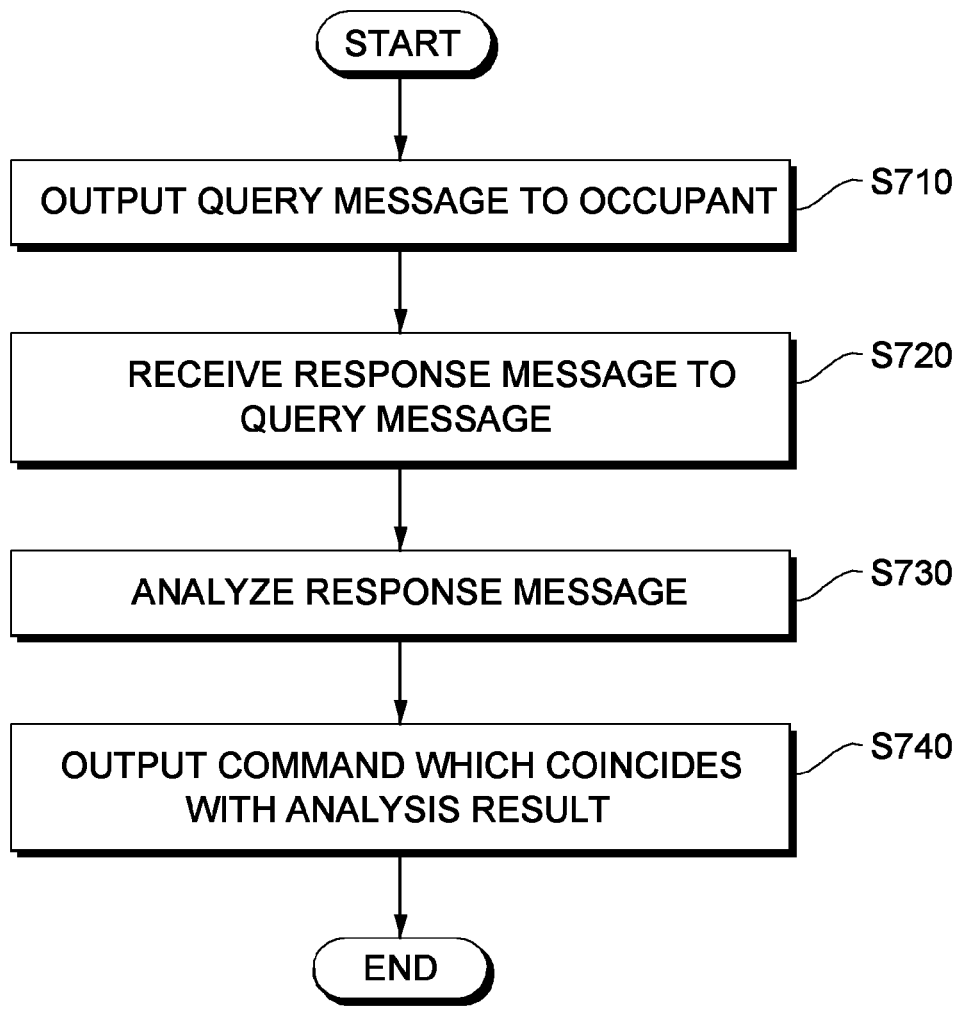

[FIG. 8]
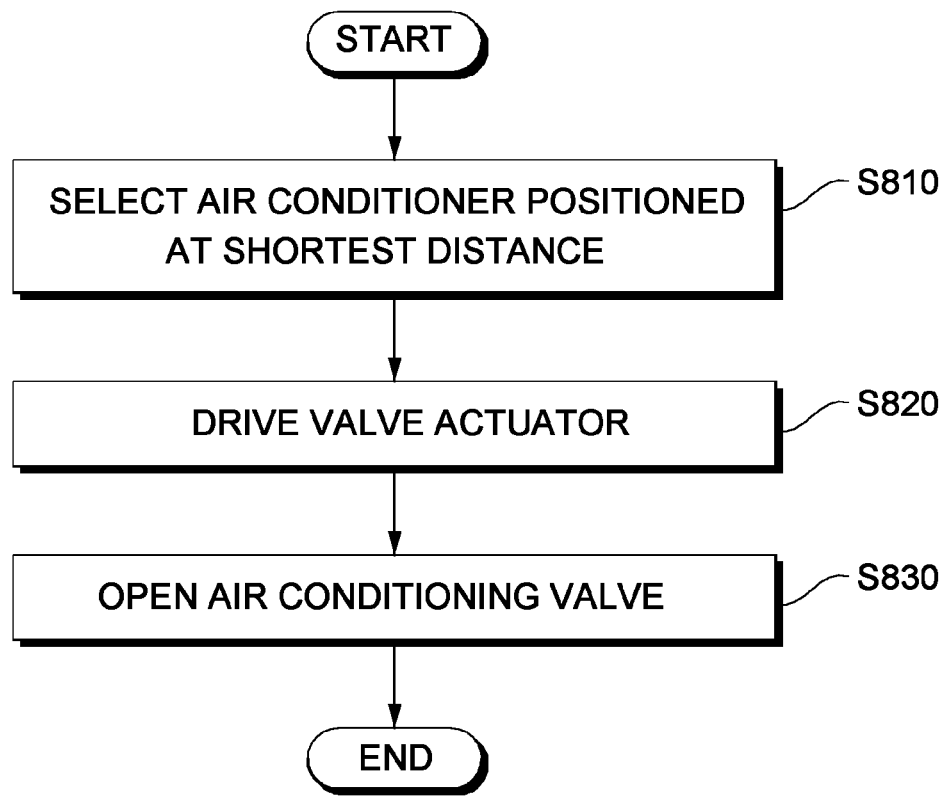

[FIG. 9]
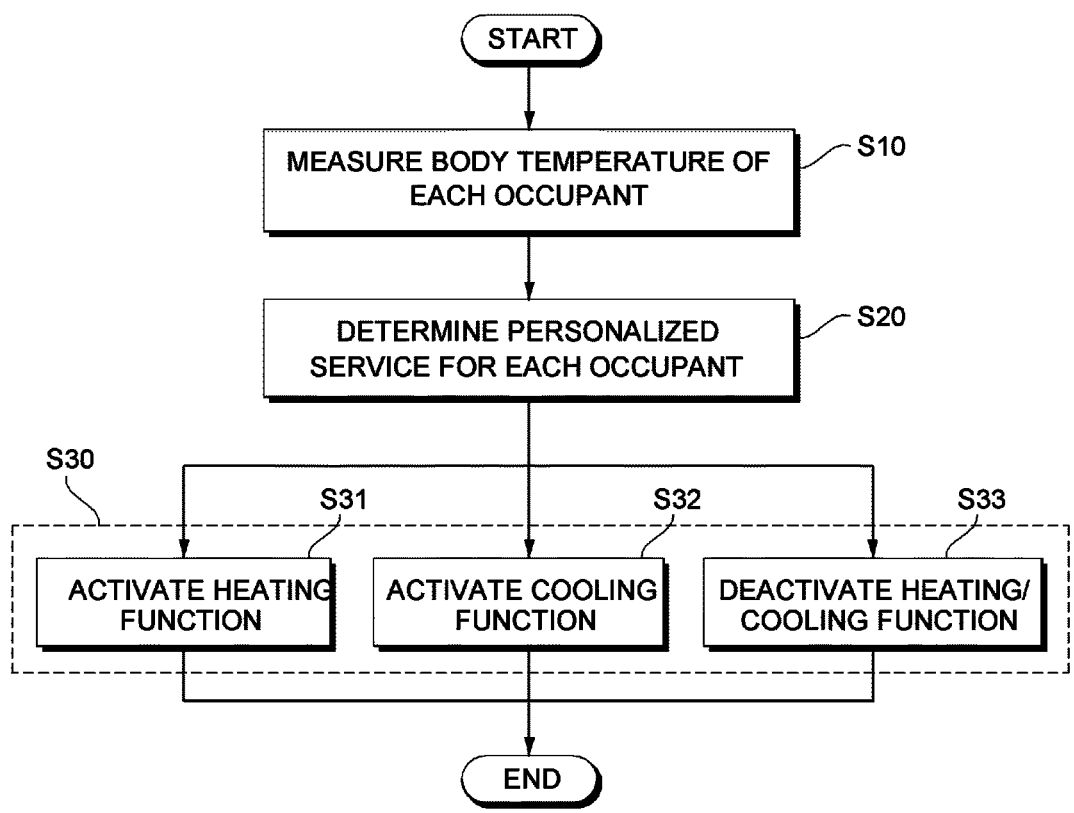

CUSTOMIZED AIR CONDITIONER CONTROLLING SYSTEM AND METHOD THEREOF

CROSS-REFERENCE TO RELATED APPLICATIONS

This application claims priority to and the benefit of Korean Patent Application No. 10-2013-0110969 filed in the Korean Intellectual Property Office on Sep. 16, 2013, the entire contents of which are incorporated herein by reference.

TECHNICAL FIELD

The present invention relates to a system and a method of controlling an air conditioner. More particularly, the present invention relates to a system and a method of controlling an air conditioner, which are customized to a vehicle occupant including a driver.

BACKGROUND ART

In general, an air conditioning system for a vehicle is an apparatus that cools/heats an interior of the vehicle or purifies interior air, and maintains appropriate humidity. The air conditioning system maintains the interior in a fresh state and prevents a glass window from clouding or being frosted so as to secure a driver's visibility, thereby achieving safe driving.

However, in the air conditioning system for a vehicle in the related art, a temperature in the vehicle is integrally controlled regardless of a state of each occupant, and as a result, some occupants feel inconvenient such as cold, hot, and the like. That is, the air conditioning system in the related art is centralized, and as a result, requirements of all occupants cannot be satisfied simultaneously.

In the air conditioning system in the related art, a driver or a person who is occupant in a front/rear seat experiences inconvenience to change setting several times according to an intention of the occupant.

Korean Patent Application Laid-Open No. 1997-0000652 discloses a method of controlling an air conditioner for a vehicle. However, this method cannot solve the aforementioned problem because an interior temperature is adjusted based on an outside temperature regardless of the intention of the occupant in spite of being switched from a manual operating step to an automatic control mode.

SUMMARY OF THE INVENTION

The present invention has been made in an effort to provide a system and a method of controlling an air conditioner so as to provide cooling or heating which are customized to each occupant by measuring a body temperature of each occupant.

An exemplary embodiment of the present invention provides a customized air conditioner controlling system including: a body temperature measuring unit measuring a body temperature of each occupant in a vehicle; a personalized service determining unit determining a personalized service including whether to drive a cooling device or a heating device for each occupant based on the body temperature of each occupant; and an air conditioner controlling unit controlling an air conditioner discriminatively for each occupant based on the personalized service.

The system may further include: a voice position detecting unit detecting a position where a voice is output; and a voice analyzing unit analyzing the voice, and the air conditioner controlling unit may control the air conditioner so that a personalized service, which coincides with an analysis result of the voice, is provided to the position where the voice is detected.

The system may further include a health state judging unit judging a health state of each occupant based on the body temperature of each passenger, and the air conditioner controlling unit may control the air conditioner based on the health state.

The health state judging unit may include: a first determination unit determining whether the body temperature is within a normal body temperature range by comparing the body temperature and the normal body temperature range with each other; a cooling/heating driving stopping unit stopping the driving of the cooling device or the heating device and allowing the cooling device or the heating device to stand by until a predetermined time elapses when it is determined that the temperature is not within the normal body temperature range; a second determination unit determining whether a body temperature remeasured after the predetermined time elapsed is within the normal body temperature range by comparing the remeasured body temperature and the normal body temperature range with each other; and a health disorder notifying unit notifying a fact of a health disorder to the corresponding occupant when it is determined that the remeasured body temperature is not within the normal body temperature range.

The personalized service determining unit may include: an interior temperature measuring unit measuring an interior temperature of the vehicle; a first comparison unit calculating a difference value between the body temperature and the interior temperature, and determining whether an absolute value of the difference value is equal to or more than a reference value by comparing the absolute value of the difference value and the reference value with each other; a second comparison unit comparing the body temperature with a sum-up value of the interior temperature and a predetermined offset temperature to determine whether the body temperature is higher than the sum-up value when it is determined that the absolute value of the difference value is equal to or more than the reference value; and a cooling/heating determining unit determining the personalized service so as to drive the cooling device when it is determined that the body temperature is higher than the sum-up value and determining the personalized service so as to drive the heating device when it is determined that the body temperature is lower than the sum-up value.

The cooling/heating determining unit may query a desired personalized service to the corresponding occupant before any one of the cooling device and the heating device is actuated after any one of cooling and heating is determined, and analyze a response of the corresponding occupant to determine the personalized service of the corresponding occupant.

The cooling/heating determining unit may determines the personalized service of a corresponding occupant by judging a health state of the corresponding occupant based on the body temperature when it is determined that the body temperature is equal to the interior temperature. The cooling/heating determining unit may query the desired personalized service to the corresponding occupant and analyze the response of the corresponding occupant to determine the personalized service of the corresponding occupant when it is determined that the body temperature is equal to the interior temperature.

The body temperature measuring unit may measure the body temperature by using a non-contact type sensor.

The body temperature measuring unit may use a thermal image camera or an infrared temperature sensor as the non-contact type sensor and measure the body temperature from the temperature of a skin of a face of each occupant.

The body temperature measuring unit may measure the body temperature or the sensory temperature by considering the strength of wind output from the cooling device or the heating device, and the interior temperature of the vehicle. Only when change rate of an interior temperature is less than a reference value based on a personalized service operating reference, the body temperature is used to be the same as the sensory temperature and when the change rate of the interior temperature becomes more than the reference value by a cooling device or a heating device, the body temperature and the sensory temperature are determined by a sensory temperature calculation equation.

The air conditioner controlling unit may determine an occupant to which the personalized service is provided for each air conditioner based on a distance from the occupant.

Another exemplary embodiment of the present invention provides a customized air conditioner controlling method including: measuring a body temperature of each occupant in a vehicle; determining a personalized service including whether to drive a cooling device or a heating device for each occupant based on the body temperature of each occupant; and controlling an air conditioner discriminatively for each occupant based on the personalized service.

The method may further include: before the controlling of the air conditioner, detecting a position where a voice is output; and analyzing the voice, and in the controlling of the air conditioner, the air conditioner may be controlled so that a personalized service, which coincides with an analysis result of the voice, is preferentially provided to the position where the voice is detected.

The method may further include: between the measuring of the body temperature and the controlling of the air conditioner, judging a health state of each occupant based on the body temperature of each passenger, and in the controlling of the air conditioner, the air conditioner may be controlled based on the health state.

The judging of the health state may include: determining whether the body temperature is within a normal body temperature range by comparing the body temperature and the normal body temperature range with each other; stopping the driving of the cooling device or the heating device and allowing the cooling device or the heating device to stand by until a predetermined time elapses when it is determined that the temperature is not within the normal body temperature range; determining whether a body temperature remeasured after the predetermined time elapsed is within the normal body temperature range by comparing the remeasured body temperature and the normal body temperature range with each other; and notifying a fact of a health disorder to the corresponding occupant when it is determined that the remeasured body temperature is not within the normal body temperature range.

The determining of the personalized service may include: measuring an interior temperature of the vehicle; calculating a difference value between the body temperature and the interior temperature, and determining whether an absolute value of the difference value is equal to or more than a reference value by comparing the absolute value of the difference value and the reference value with each other; comparing the body temperature with a sum-up value of the interior temperature and a predetermined offset temperature to determine whether the body temperature is higher than the sum-up value when it is determined that the absolute value of the difference value is equal to or more than the reference value; and determining the personalized service so as to drive the cooling device when it is determined that the body temperature is higher than the sum-up value and determining the personalized service so as to drive the heating device when it is determined that the body temperature is lower than the sum-up value.

In the determining of the cooling or the heating, any one of cooling and heating, may be determined, a desired personalized service may be queried to the corresponding occupant before any one of the cooling device and the heating device is actuated, and a response of the corresponding occupant is analyzed to determine the personalized service of the corresponding occupant or a health state of a corresponding occupant is judged based on the body temperature when it is determined that the body temperature is equal to the interior temperature to determine the personalized service of the corresponding occupant.

In the measuring of the body temperature, the body temperature or the sensory temperature may be measured from the temperature of the skin of the face of each occupant by considering the strength of wind output from the cooling device or the heating device, and the interior temperature of the vehicle. Only when change rate of an interior temperature is less than a reference value based on a personalized service operating reference, the body temperature is used to be the same as the sensory temperature and when the change rate of the interior temperature becomes more than the reference value by a cooling device or a heating device, the body temperature and the sensory temperature are determined by a sensory temperature calculation equation.

In the controlling of the air conditioner, an occupant to which the personalized service is provided for each air conditioner may be determined based on a distance from the occupant.

According to exemplary embodiments of the present invention, the following effects can be obtained through a configuration for achieving the object.

First, individual cooling/heating systems are actuated for respective occupants, which have artificial intelligence to increase convenience of an occupant.

Second, an additional operating switch need not be actuated by controlling an air conditioner through voice dialogue and the convenience of the occupant can be increased.

Third, the air conditioner is controlled based on a skin temperature of each occupant to increase sensitive satisfaction depending on a sensory temperature felt by the occupant.

Fourth, an in-vehicle intelligent system is configured, which has a function an artificial intelligent air conditioning system to improve merchantability.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a block diagram schematically illustrating a customized air conditioner controlling system according to an exemplary embodiment of the present invention.

FIG. 2 is a block diagram illustrating an internal configuration of a personalized service determining unit illustrated in FIG. 1.

FIG. 3 is a block diagram illustrating an internal configuration of a health state judging unit according to the exemplary embodiment.

FIG. 4 is a conceptual diagram illustrating an intelligent system of a vehicle according to the exemplary embodiment of the present invention.

FIG. 5 is a flowchart illustrating a personalized service determining method according to another exemplary embodiment.

FIG. 6 is a flowchart illustrating a health state judging method according to the exemplary embodiment.

FIG. 7 is a flowchart illustrating a voice analyzing method according to the exemplary embodiment.

FIG. 8 is a flowchart illustrating a method of controlling an air conditioner according to the exemplary embodiment.

FIG. 9 is a flowchart schematically illustrating a customized air conditioner controlling method according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. In the figures, even though the parts are illustrated in different drawings, it should be understood that like reference numbers refer to the same or equivalent parts of the present invention throughout the several figures of the drawing. When it is judged that specific description on known configurations or functions related in the description of the present disclosure may unnecessarily obscure the essentials of the present disclosure, the detailed description will be omitted. Hereinafter, exemplary embodiments of the present disclosure will be described. However, it should be understood that a technical spirit of the invention is not limited to the specific embodiments, but may be changed or modified by those skilled in the art.

FIG. 1 is a block diagram schematically illustrating a customized air conditioner controlling system according to an exemplary embodiment of the present invention.

According to FIG. 1, a customized air conditioner controlling system 100 includes a body temperature measuring unit 110, a personalized service determining unit 120, an air conditioner controlling unit 130, a power supply unit 170, and a main control unit 180.

The power supply unit 170 serves to supply power to respective components constituting the customized air conditioner controlling system 100. In general, since a battery for a vehicle is mounted on the vehicle, the power supply unit 170 may not be separately provided in the exemplary embodiment.

The main control unit 180 serves to control all operations of the respective components constituting the customized air conditioner controlling system 100. Since the respective components constituting the customized air conditioner controlling system 100 may be controlled by an electronic control unit (ECU) of the vehicle, the main control unit 180 may not be separately provided in the exemplary embodiment.

The body temperature measuring unit 110 serves to measure a body temperature of each occupant in the vehicle. The occupant as a concept including persons which get in the vehicle includes a driver.

The body temperature measuring unit 110 may measure a body temperature of the occupant by using a non-contact type sensor. In this case, the body temperature measuring unit 110 may use a sensor mounted on each door or a ceiling of the vehicle.

The body temperature measuring unit 110 may use a thermal image camera or an infrared temperature sensor as the non-contact type sensor. The body temperature measuring unit 110 may measure a body temperature or a sensory temperature of the occupant from a face skin temperature of each occupant by means of this sensor. Only when change rate of an interior temperature is less than a reference value based on a personalized service operating reference, the body temperature is used to be the same as the sensory temperature and when the change rate of the interior temperature becomes more than the reference value by a cooling device or a heating device, the body temperature and the sensory temperature are determined by a sensory temperature calculation equation.

The body temperature measuring unit 110 may measure the body temperature of the occupant by the strength of wind output from the cooling device or the heating device, and the interior temperature of the vehicle.

The personalized service determining unit 120 serves to determine a personalized service for each occupant based on the body temperature of each occupant. The personalized service determining unit 120 determines whether to drive the cooling device or drive the heating device only for the corresponding occupant with the personalized service.

The personalized service determining unit 120 may determine the personalized service by comparing a sum-up value of the interior temperature of the vehicle and a predetermined offset temperature, and the body temperature of the occupant. The personalized service determining unit 120 may also determine the personalized service by comparing the interior temperature of the vehicle and the body temperature of the occupant. FIG. 2 is a block diagram illustrating an internal configuration of the personalized service determining unit illustrated in FIG. 1.

According to FIG. 2, the personalized service determining unit 120 may include an interior temperature measuring unit 121, a first comparison unit 122, a second comparison unit 123, and a cooling/heating determining unit 124.

The interior temperature measuring unit 121 serves to measure the interior temperature of the vehicle.

The first comparison unit 122 serves to calculate a difference value between the body temperature of the occupant and the interior temperature and compare an absolute value of the difference value and a reference value to determine whether the absolute value is equal to or more than the reference value.

When it is determined that the absolute value is equal to or more than the reference value, the second comparison unit 123 serves to determine whether the body temperature is higher than the sum-up value by comparing the body temperature and the sum-up value with each other.

On the contrary, when it is determined that the absolute value is less than the reference value, it is regarded that there is no occupant in a corresponding seat, and as a result, the personalized service determining unit 120 does not determine the personalized service for the seat.

When it is determined that the body temperature is higher than the sum-up value, the cooling/heating determining unit 124 serves to determine the personalized service so as to drive the cooling device.

When it is determined that the body temperature is lower than the sum-up value, the cooling/heating determining unit 124 serves to determine the personalized service so as to drive the heating device.

When it is determined that the body temperature is equal to the interior temperature, the cooling/heating determining unit 124 serves to determine the personalized service of the corresponding occupant by judging a health state of the corresponding occupant based on the body temperature. For example, when the cooling/heating determining unit 124 may determine the personalized service so as to drive the heating device when the body temperature is lower than a normal body temperature which is generally known and determine the personalized service so as to drive the cooling device when the body temperature is higher than the normal body temperature.

Meanwhile, the cooling/heating determining unit 124 queries a desired personalized service to the corresponding occupant before any one of the cooling device and the heating device is actuated after determines any one of cooling and heating, and analyzes a response of the corresponding occupant to determine the personalized service of the corresponding occupant. The cooling/heating determining unit 124 may query the desired personalized service to the corresponding occupant and analyze the response of the corresponding occupant to determine the personalized service of the corresponding occupant when it is determined that the body temperature is equal to the interior temperature.

Referring back to FIG. 1, the description will be made.

The air conditioner controlling unit 130 serves to control an air conditioner discriminatively for each occupant based on the personalized service determined by the personalized service determining unit 120.

The air conditioner controlling unit 130 may determine the occupant to which the personalized service will be provided for each air conditioner based on a distance from the occupant.

The air conditioner controlling unit 130 assigns each air conditioner based on a distance difference from the occupant so as to smoothly provide a cooling/heating service to all occupants. However, a first occupant that is not assigned with the air conditioner and a second occupant that is assigned with a plurality of air conditioners may be generated. In this case, among the plurality of air conditioners, an air conditioner that is positioned to be the farthest from the second occupant or an air conditioner that is positioned to be the closest to the first occupant is reassigned to the first occupant.

Meanwhile, a third occupant that is not assigned with the air conditioner and the remaining occupants that are assigned with the air conditioners one by one may be generated. In this case, an air conditioner that is positioned to be the closet to the third occupant provides the cooling/heating service to the third occupant for a predetermined time.

The customized air conditioner controlling system 100 may further include a voice position detecting unit 140 and a voice analyzing unit 150.

The voice position detecting unit 140 serves to detect a position where a voice is output.

The voice analyzing unit 150 serves to deduce a meaning of the voice by analyzing the voice.

When the customized air conditioner controlling system 100 further includes the voice position detecting unit 140 and the voice analyzing unit 150, the air conditioner controlling unit 130 may control the air conditioner so as to provide the personalized service which coincides with an analysis result of the voice to a position where the voice is detected.

The customized air conditioner controlling system 100 may further include a health state judging unit 150.

The health state judging unit 150 serves to judge a health state of each occupant based on the body temperature of each occupant.

When the customized air conditioner controlling system 100 further includes the health state judging unit 150, the air conditioner controlling unit 130 may control the air conditioner based on the health state of the occupant.

The health state judging unit 150 may judge the health state of the occupant by comparing the body temperature of the occupant and a normal body temperature of a general person. FIG. 3 is a block diagram illustrating an internal configuration of the health state judging unit according to the exemplary embodiment.

According to FIG. 3, the health state judging unit 160 may include a first determination unit 161, a cooling/heating driving stopping unit 162, a second determination unit 163, and a health disorder notifying unit 164.

The first determination unit 161 serves to determine whether the body temperature is within a normal body temperature range by comparing the body temperature of the occupant and the normal body temperature range with each other.

The cooling/heating driving stopping unit 162 serves to stop the driving of the cooling device or the heating device and allow the cooling device or the heating device to stand by until a first predetermined time elapses when it is determined that the body temperature is not within the normal body temperature range.

The second determination unit 163 serves to determine whether a body temperature remeasured after the first time elapsed is within the normal body temperature range by comparing the remeasured body temperature and the normal body temperature range with each other.

The health disorder notifying unit 164 serves to notify a fact of a health disorder to the corresponding occupant when it is determined that even the remeasured body temperature is not within the normal body temperature range.

When several persons get in the vehicle, air conditioning temperatures required by respective occupants may be different from each other. An air conditioning system in the related art may just maintain the interior temperature of the vehicle constantly, but may not control the temperature discriminatively depending on the body temperature of the occupant.

The present invention proposes an artificial intelligent system that may provide a customized service to the occupant by measuring the body temperature or the skin temperature of the occupant by using the non-contact type sensor and interwork through voice dialogue with the occupant. The proposed system actuates a customized air conditioner for each occupant by measuring the body temperature or the skin temperature of the occupant, thereby increasing convenience of the occupant.

Hereinafter, the present invention will be described by using an exemplary embodiment. FIG. 4 is a conceptual diagram illustrating an intelligent system of a vehicle according to the exemplary embodiment of the present invention. The following description will be made with reference to FIG. 4.

An intelligent system 400 of the vehicle includes a non-contact type sensor 410, a voice dialogue virtual machine 420, air-conditioners/heaters 430a to 430n, and a vehicle control ECU 440.

The non-contact type sensor 410 senses an occupant and may transmit and receive data by methods including a CAN, an USB, a wireless method, and the like with the vehicle control ECU 440. The non-contact type sensor 410 may be implemented by a thermal image camera or an infrared temperature sensor.

The voice dialogue virtual machine 420 performs voice dialogue with the occupant according to a control command from a communion unit 441 in the vehicle control ECU 440. The voice dialogue virtual machine 420 includes a microphone and a speaker for the voice dialogue with the occupant.

The air-conditioners/heaters 430a to 430n that are divided in plural through a distribution nozzle are mounted on the vehicle. As one example, in FIG. 4, the first air-conditioner/heater 430a represents an air-conditioner/heater placed on a driver seat, the second air-conditioner/heater 430b represents an air-conditioner/heater placed on a passenger seat, and the n-th air-conditioner-heater 430n represents an air-conditioner/heater placed on a rear seat.

The vehicle control ECU 440 may include the communion unit 441, a health state judging unit 442, an air conditioner controlling unit 443, and the like.

The communion unit 441 verifies a state of the occupant and judges whether to actuate the air conditioner, based on a dialogue content with the occupant analyzed by the voice dialogue virtual machine 420.

The health state judging unit 442 judges the health state of the occupant based on information acquired from the non-contact type sensor 410.

The air conditioner controlling unit 443 controls air conditioning devices, which supply cold air or hot air depending on the occupant by using the CAN, that is, the air conditioners/heaters 430a to 430n. The air conditioner controlling unit 443 controls the cold air or the hot air to be supplied to each occupant as the customized service based on the body temperature of the occupant.

Next, a personalized service determining method of the personalized service determining unit 120 illustrated in FIG. 1 will be described by using an exemplary embodiment. FIG. 5 is a flowchart illustrating a personalized service determining method according to an exemplary embodiment.

In general, when an outside temperature is lower than the body temperature, heat is lost from a skin of the occupant and when the outside temperature is higher than the body temperature, heat is absorbed. When the heat is lost, a passenger recognizes that it is cold and when the heat is absorbed, the passenger recognizes that it is hot. When the passenger recognizes that it is cold, the passenger actuates the heating device and when the passenger recognizes that it is hot, the passenger actuates the cooling device.

A reference to judge that it is cold or hot may be determined according to an equation described below.

$$|\text{Interior temperature of vehicle} - \text{body temperature of occupant}| > \text{setting value}$$

In the equation, the setting value may be set to, for example, 1.5° C.

In the equation, when a difference value between the interior temperature of the vehicle and the body temperature of the occupant is a plus value, it may be judged that the occupant recognizes that it is hot and when the difference value is a minus value, it may be judged that the occupant recognizes that it is cold.

First, the interior temperature of the vehicle and the sensory temperature of the occupant are measured (S510 and S520). The sensory temperature is determined by synthesizing heat loss by the interior temperature and heat loss by wind of the air conditioner. The reason is that there is no wind in the vehicle, but when the heater or the air conditioner is actuated, an influence by the wind is exerted. The sensory temperature may be acquired by, for example, an equation described below.

$$\text{Sensory temperature (°C.)} = 13.12 + 0.6215 \times T - 11.37 \times 0.16V + 0.3965 \times 0.16V \times T$$

In the equation, T represents the interior temperature (° C.) and V represents a wind speed (km/h) of the wind.

The sensory temperature may be based on a skin temperature of a person's face measured by the thermal image camera. The reason is that the skin temperature and the body temperature are equal to each other under a situation without heat loss/heat absorption and a human body has a property to maintain the body temperature through blood circulation even under a situation with the heat loss/heat absorption.

A method of measuring the sensory temperature by using the thermal image camera will be described below. First, a seat occupied by the occupant is verified. Thereafter, a distribution chart is prepared with parts where a value within a normal body temperature range of a person is measured. Since a part where a skin is exposed is a face of a person in general, a contour line is extracted within the distribution and the contour line is compared with information stored in a DB to determine a face area of the occupant. The information stored in the DB may be built up in advance through neuron network learning. Thereafter, a sensory temperature is measured from the face area of the occupant to be determined.

Thereafter, an absolute value of a difference value of both measured values is compared with a setting value (S530) and when the absolute value is smaller than the setting value, it is judged that a person does not occupy the corresponding seat (S540). However, only if the measured body temperature deviates from the normal body temperature range of the person, it is judged that the person does not occupy the seat and if not so, the judgment is withheld.

When the absolute value is equal to or more than the setting value, an interior temperature of a vehicle and the sensory temperature of the occupant are compared with each other (S550). When the sensory temperature of the occupant is higher than the interior temperature of the vehicle, a cooler is actuated (S560) and when the sensory temperature of the occupant is lower than the interior temperature of the vehicle, a heater is actuated (S570). When the sensory temperature of the occupant is equal to an interior temperature of the vehicle, neither of the cooler and the heater is actuated (S580).

Next, a health state judging method of the health state judging unit 160 illustrated in FIG. 1 will be described by using an exemplary embodiment. FIG. 6 is a flowchart illustrating the health state judging method according to the exemplary embodiment.

When the sensory temperature of the occupant is determined, a process of judging the health state of the occupant is started. First, the sensory temperature and the normal body temperature range are compared with each other (S605). In this case, the normal body temperature range is set to 35 to 37.5° C. to be compared with the sensory temperature. The comparison (S605) of the sensory temperature and the normal body temperature range is continuously repeated with a spare time of approximately 20 seconds (S635).

When the sensory temperature is within the normal body temperature range, it is judged that the health state of the occupant is normal (S610) and the sensory temperature and a reference value (ex. 36.5° C.) are compared with each other (S615).

When the sensory temperature is higher than the reference value, a cooler is actuated (S620) and when the sensory temperature is lower than the reference value, a heater is actuated (S625). When the sensory temperature is equal to the reference value, neither of the cooler and the heater are actuated (S630).

Meanwhile, the case where the sensory temperature deviates from the normal body temperature range may be caused by a high-fever symptom or a slight-fever symptom of the occupant, but such a phenomenon may occur by the heater or the cooler. Accordingly, in this case, the heater or the cooler which is being actuated is stopped and the judgment of the health state of the occupant is withheld (S640, S645, and S650). However, if the same phenomenon is repeated even after the heater or the cooler is stopped, it is judged that the health of the occupant is subjected to the disorder and a warning message is sent so as for all persons to get in the vehicle to verify the fact (S655).

Next, a voice analyzing method of the voice analyzing unit 150 illustrated in FIG. 1 will be described by using an exemplary embodiment. FIG. 7 is a flowchart illustrating the voice analyzing method according to the exemplary embodiment.

First, a query message is output to the occupant by using a speaker (S710). The query message may be, for example, "Would you actuate a cooler?".

When a response message to the query message is input through a microphone (S720), an input voice is compared with information stored in a voice DB to be analyzed (S730).

Thereafter, a command by an analysis result is output to an air conditioner controlling unit so as to perform air conditioning control which coincides with the analysis result (S740).

Next, an air conditioner controlling method of the air conditioner controlling unit 130 illustrated in FIG. 1 will be described by using an exemplary embodiment. FIG. 8 is a flowchart illustrating the method of controlling an air conditioner according to the exemplary embodiment.

First, each occupant selects an air conditioner that is positioned at a shortest distance (S810). Since temperatures optimally considered by respective occupants are different from each other, the air conditioner that is positioned at the shortest distance may be selected, and only the air conditioner may be driven.

Thereafter, actuation of each air conditioner is induced to perform the air conditioning control customized for each occupant. The air conditioning control may be performed in such a manner that a valve actuator is driven (S820) to open an air conditioning valve (S830).

Main features of the present invention described above are summarized as below.

First, the customized air conditioner controlling system provides individual cooling/heating services which are customized for the occupant in the vehicle.

Second, the customized air conditioner controlling system measures the temperature of the surface of the face of the occupant as the sensory temperature by using the non-contact type sensor.

Third, the customized air conditioner controlling system provides the customized service to the occupant by comparing the interior temperature of the vehicle and the sensory temperature.

Fourth, the customized air conditioner controlling system judges the health state of the occupant by considering the interior/outside temperature of the vehicle and an environment temperature condition based on the sensory temperature. In this case, the customized air conditioner controlling system judges the health state of the occupant by considering whether the sensory temperature is caused by a temporary external change or the health disorder of the occupant.

Fifth, the customized air conditioner controlling system judges whether individual cooling/heating systems are actuated through the voice dialogue with the occupant.

Sixth, the customized air conditioner controlling system extracts the temperature of the surface of the face of the occupant by using a temperature distribution chart within a predetermined screen.

Seventh, the customized air conditioner controlling system extracts a cooling/heating control signal by using an algorithm to judge the heat loss/heat absorption of the occupant based on the sensory temperature and the interior temperature of the vehicle.

Eighth, the customized air conditioner controlling system actuates a cooling/heating system that is positioned at the shortest distance from the occupant.

Next, a method of controlling the air conditioner customized to a user will be organized by using the customized air conditioner controlling system described in FIG. 1. FIG. 9 is a flowchart schematically illustrating a customized air conditioner controlling method according to an exemplary embodiment of the present invention.

First, the body temperature measuring unit 110 measures the body temperature of each occupant in the vehicle (S10).

Thereafter, the personalized service determining unit 120 determines the personalized service including whether to drive the cooling device or the heating device for each occupant based on the body temperature of each occupant (S20).

The personalized service determining method (S20) is performed in detail as below.

First, the personalized service determining unit 120 measures the interior temperature of the vehicle.

Thereafter, the personalized service determining unit 120 calculates a difference value between the body temperature of the occupant and the interior temperature of the vehicle.

Thereafter, the personalized service determining unit 120 compares an absolute value of the difference value and a reference value to determine whether the absolute value is equal to or more than the reference value.

When it is determined that the absolute value is equal to or more than the reference value, the personalized service determining unit 120 compares a sum-up value of the interior temperature and an offset temperature, and the body temperature to determine whether the body temperature is higher than the sum-up value.

When it is determined that the body temperature is higher than the sum-up value, the personalized service determining unit 120 determines the personalized service so as to drive the cooling device. On the contrary, when it is determined that the body temperature is lower than the sum-up value, the personalized service determining unit 120 determines the personalized service so as to drive the heating device.

Meanwhile, the personalized service determining unit 120 may also compare the body temperature and the interior temperature with each other to determine whether the body temperature is higher than the interior temperature.

When it is determined that the body temperature is higher than the interior temperature, the personalized service determining unit 120 determines the personalized service so as to drive the cooling device. On the contrary, when it is determined that the body temperature is lower than the interior temperature, the personalized service determining unit 120 determines the personalized service so as to drive the heating device.

On the contrary, when it is determined that the body temperature is equal to the interior temperature, the personalized service determining unit 120 determines the personalized service so as to drive none of the heating device and the cooling device. However, the present invention is not limited thereto and the personalized service determining unit 120 queries a desired personalized service to the corresponding occupant and analyzes a response of the corresponding occupant to determine the personalized service of the corresponding occupant or judges the health state of the corresponding occupant based on the body temperature to determine the personalized service of the corresponding occupant.

When the personalized service is determined, the air conditioner controlling unit 130 controls the air conditioner by discriminating the respective occupants based on the personalized service (S30). The air conditioner controlling unit 130 controls the air conditioner so as to activate a cooling function (S31), controls the air conditioner so as to activate a cooling function (S32), or controls the air conditioner so as to deactivate both the heating function and the cooling function (S33).

Meanwhile, when a position where a voice is output is detected and the voice is analyzed by the voice position detecting unit 140 and the voice analyzing unit 150, the air conditioning control unit 130 controls the air conditioner so that a personalized service which coincides with an analysis result of the voice at the position where the voice is detected to be preferentially provided to the personalized service based on the body temperature of the occupant so that the voice of the air conditioning controlling unit 130. Even though the personalized service is progressed based on the body temperature of the occupant, the corresponding personalized service is changeable to the personalized service which coincides with the analysis result of the voice.

Meanwhile, the health state judging unit 160 judges the health state of each occupant based on the body temperature of each occupant. The air conditioner controlling unit 130 may also control the air conditioner based on a judgment result of the health state.

Meanwhile, the embodiments according to the present invention may be implemented in the form of program instructions that can be executed by computers, and may be recorded in computer readable media. The computer readable media may include program instructions, a data file, a data structure, or a combination thereof. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An air conditioner controlling apparatus, comprising:
   a body temperature sensor configured to measure respective body temperatures of occupants in a vehicle, based on an interior temperature of the vehicle and wind speeds from respective air conditioners corresponding to the occupants;
   a personalized service determining processor configured to determine whether to drive each of the air conditioners based on the respective body temperatures; and
   an air conditioner controller configured to control the each of the air conditioners based on the determination whether to drive the each of the air conditions.

2. The system of claim 1, further comprising:
   a voice position detecting unit detecting a position where a voice is output; and
   a voice analyzing unit analyzing the voice,
   wherein the air conditioner controlling unit controls the air conditioner so that a personalized service, which coincides with an analysis result of the voice, is preferentially provided to the position where the voice is detected.

3. The system of claim 1, further comprising:
a health state judging unit judging a health state of each occupant based on the body temperature of each passenger,
wherein the air conditioner controlling unit controls the air conditioner based on the health state.

4. The system of claim 3, wherein the health state judging unit includes:
a first determination unit determining whether the body temperature is within a normal body temperature range by comparing the body temperature and the normal body temperature range with each other;
a cooling/heating driving stopping unit stopping the driving of the cooling device or the heating device and allowing the cooling device or the heating device to stand by until a predetermined time elapses when it is determined that the temperature is not within the normal body temperature range;
a second determination unit determining whether a body temperature remeasured after the predetermined time elapsed is within the normal body temperature range by comparing the remeasured body temperature and the normal body temperature range with each other; and
a health disorder notifying unit notifying a fact of a health disorder to the corresponding occupant when it is determined that the remeasured body temperature is not within the normal body temperature range.

5. The apparatus of claim 1, wherein the personalized service determining processor comprises:
an interior temperature sensor configured to measure the interior temperature;
a first comparison processor configured to calculate a difference value between one of the respective body temperatures and the interior temperature, and to determine whether an absolute value of the difference value is greater than or equal to a reference value;
a second comparison processor configured to compare a temperature value with the one of the respective body temperatures, in response to determining that the absolute value of the difference value is greater than or equal to the reference value, wherein the temperature value is a sum of the interior temperature and an offset temperature; and
a cooling/heating determining processor configured to determine to drive a cooler of the air conditioners, in response to determining that the one of the respective body temperatures is higher than the temperature value, and to determine to drive a heater of the air conditioners, in response to determining that the one of the respective body temperatures is lower than the temperature value.

6. The apparatus of claim 5, wherein the cooling/heating determining processor is further configured to query temperature regulation data of one of the occupants before the cooler or the heater is driven, and to analyze a response of the one of the occupants to determine the temperature regulation data of the one of the occupants after a cooling operation or a heating operation is determined.

7. The apparatus of claim 5, wherein the cooling/heating determining processor is further configured to determine whether to drive the cooler or the heater by determining a health state of the one of the occupants based on the one of the respective body temperatures, in response to determining that the one of the respective body temperatures is equal to the interior temperature, wherein the one of the respective body temperatures corresponds to the one of the occupants.

8. The apparatus of claim 1, wherein the body temperature sensor is further configured to measure the one of the respective body temperatures using a non-contact sensor.

9. The apparatus of claim 8, wherein the non-contact sensor comprises a thermal image camera or an infrared temperature sensor and is configured to measure a temperature of facial skin of the one of the occupants.

10. The system of claim 1, wherein the air conditioner controlling unit determines an occupant to which the personalized service is provided for each air conditioner based on a distance from the occupant.

11. The apparatus of claim 1, wherein one of the respective body temperatures is measured according to: $T_b = C_1 + C_2 T_i - C_3 V + C_4 V T_i$, where $T_b$ is the one of the respective body temperatures, $C_1$ is a first constant, $C_2$ is a second constant, $T_i$ is the interior temperature of the vehicle, $C_3$ is a third constant, $V$ is one of the wind speeds, and $C_4$ is a fourth constant.

* * * * *